United States Patent
Nemani et al.

(10) Patent No.: US 12,468,377 B2
(45) Date of Patent: Nov. 11, 2025

(54) PROCESSORS INCLUDING POWER CONTROL CIRCUITS TO REDUCE A NO-LOAD VOLTAGE TO SAVE POWER AND INCREASE LONGEVITY AND RELATED METHODS

(71) Applicant: QUALCOMM Incorporated, San Diego, CA (US)

(72) Inventors: Mahadevamurty Nemani, San Diego, CA (US); Adarsh Baraka Ravi, San Jose, CA (US); Nitin Makhija, San Jose, CA (US); Pradeep Kanapathipillai, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 18/469,890

(22) Filed: Sep. 19, 2023

(65) Prior Publication Data
US 2025/0093942 A1    Mar. 20, 2025

(51) Int. Cl.
*G06F 1/32*      (2019.01)
*G06F 1/3206*    (2019.01)
*G06F 1/3296*    (2019.01)

(52) U.S. Cl.
CPC .......... *G06F 1/3296* (2013.01); *G06F 1/3206* (2013.01)

(58) Field of Classification Search
CPC .............................. G06F 1/3296; G06F 1/3206
See application file for complete search history.

(56) References Cited

U.S. PATENT DOCUMENTS

| | | | |
|---|---|---|---|
| 11,507,170 B1 | 11/2022 | Bhattarai et al. | |
| 11,650,233 B2 | 5/2023 | Bhargava et al. | |
| 2009/0327776 A1* | 12/2009 | Nguyen | G06F 1/26 323/283 |
| 2012/0054515 A1 | 3/2012 | Naffziger et al. | |
| 2016/0291625 A1* | 10/2016 | Tripathi | G06F 1/3296 |

(Continued)

FOREIGN PATENT DOCUMENTS

WO    2020131209 A1    6/2020

OTHER PUBLICATIONS

International Search Report and Written Opinion for International Patent Application No. PCT/US2024/042132, mailed Nov. 25, 2024, 15 pages.

*Primary Examiner* — Stefan Stoynov
(74) *Attorney, Agent, or Firm* — W&T

(57) ABSTRACT

Power sources provide power in a range with a maximum supply voltage provided under zero-load current conditions. Power circuits in an IC receive and aggregate indications of load current from processor circuits in processor circuit clusters and, reduce power consumption in the IC during zero or low load current conditions by generating a voltage control signal to reduce the supply voltage. Reducing the no-load voltage also reduces stress on gate oxides of transistors in the IC to increase oxide longevity. Based on the aggregated load current indications, which is periodically updated, the no-load supply voltage may be incrementally reduced down to a voltage threshold over the course of multiple periods. In some examples, the power circuits receive throttle signals when the processor circuits are throttled due to a voltage droop, and such signals may cause the power circuits to generate a control signal to increase the no-load voltage.

30 Claims, 8 Drawing Sheets

(56) References Cited

U.S. PATENT DOCUMENTS

| | | |
|---|---|---|
| 2019/0146567 A1 | 5/2019 | Kosonocky et al. |
| 2020/0225723 A1 | 7/2020 | Zonensain et al. |
| 2021/0149476 A1* | 5/2021 | Alton ..................... G06F 1/329 |
| 2022/0376515 A1 | 11/2022 | Singh et al. |

* cited by examiner

PROCESSORS INCLUDING POWER CONTROL CIRCUITS TO REDUCE A NO-LOAD VOLTAGE TO SAVE POWER AND INCREASE LONGEVITY AND RELATED METHODS

BACKGROUND

I. Field of the Disclosure

The technology of the disclosure relates generally to power management in a multi-core processor and, more particularly, to reducing power consumption while maintaining voltage droop protection.

II. Background

The power demands of processor circuits in integrated circuits (ICs) can change suddenly as processor activity changes. A sudden increase in current demand can deplete charge in a power distribution network inside and outside the IC, causing a voltage droop to occur before a power supply (e.g., from a voltage regulator) external to the IC can react to supply more power. Processing errors can occur if the processor voltage drops below a minimum voltage threshold of the circuits in the IC. ICs can be tested to determine the magnitude of their worst-case voltage droop caused by a sudden transition from a state of no-load current to a highest level of activity at maximum load current. Thus, by setting a supply voltage in a state of no-load current to a level that exceeds the minimum voltage threshold by the same magnitude, processor circuit failures can be avoided even if a voltage droop occurs. Some voltage regulators respond to the voltage droop by attempting to immediately restore the voltage to the original (e.g., no-load current) supply voltage. On the other hand, active load line technology allows the supply voltage to stay at the drooped level (but above the minimum voltage threshold) while at the maximum load current and then increase as the load current decreases, in accordance with a decrease in processor activity. However, the higher voltage provided by such voltage regulators under no/low load current conditions consumes a higher level of power and also unnecessarily stresses gate oxides of transistors in the processor circuit, reducing their longevity.

SUMMARY

Aspects disclosed in the detailed description include processors including power control circuits to reduce a no-load voltage to save power and increase longevity. Related methods of reducing a no-load voltage are also disclosed. Power sources, such as voltage regulators, provide power to clusters of processor circuits in integrated circuits (ICs). Employing active load line technology or other techniques, power sources maintain a power supply voltage within a desired range in the event of voltage droop, which may be caused by changing activity levels. A maximum supply voltage of the desired range is provided under no-load current conditions. Exemplary power circuits in an IC aggregate indications of load current from processor circuits in the clusters and generate a voltage control signal to control the power source to reduce the supply voltage to reduce power consumption in the IC during zero or low load current conditions. Reducing the no-load voltage also reduces stress on gate oxides of transistors in the IC to increase oxide longevity. Based on the aggregated load current indications, which may be periodically updated, for example, the no-load supply voltage may be incrementally reduced down to a voltage threshold over the course of multiple periods. In some examples, the power circuits receive throttle signals when the processor circuits are throttled due to a voltage droop, and such signals may cause the power circuits to generate a control signal to increase the no-load voltage.

In this regard, in one exemplary aspect, an IC is disclosed. The IC includes at least one cluster, wherein each cluster includes at least one processor circuit and a cluster power circuit configured to receive, from each of the at least one processor circuit, an indication of a received load current. The IC also includes a power rail coupled to a power source configured to provide power at a supply voltage in a supply voltage range to the at least one processor circuit in the at least one cluster, wherein the supply voltage range comprises a no-load voltage provided in response to no-load current on the power rail and a processor power circuit. The IC's processor power circuit is configured to receive, from the cluster power circuit in each of the at least one cluster, an aggregation of the indications of load current received from each of the at least one processor circuit and in response to the aggregation from each of the at least one cluster comprising indications of load current lower than a first current threshold, generate a voltage control signal to reduce the no-load voltage.

In another exemplary aspect, a method in an IC comprising at least one processor circuit in each of at least one cluster is disclosed. The method includes receiving, in a cluster power circuit in each of the at least one cluster, indications of a load current from each of the at least one processor circuit. The method also includes receiving, in the at least one processor circuit in the at least one cluster, power from a power source on a power rail at a supply voltage in a supply voltage range to, wherein the supply voltage range comprises a no-load voltage provided in response to no-load current on the power rail. The method further includes receiving, from the cluster power circuit in each of the at least one cluster, an aggregation of the indications of load current received from each of the at least one processor circuit and in response to the aggregation of the indications of load current received from each of the at least one cluster comprising indications of load current lower than a first current threshold, generating a voltage control signal to reduce the no-load voltage.

In another exemplary aspect, a system is disclosed. The system includes an IC. The IC includes at least one cluster, each comprising at least one processor circuit and a cluster power circuit configured to receive, from each of the at least one processor circuit, an indication of a received load current. The IC also includes a power rail configured to provide power to the at least one processor circuit in the at least one cluster and a processor power circuit. The processor power circuit is configured to receive, from the cluster power circuit in each of the at least one cluster, an aggregation of the indications of load current received from each of the at least one processor circuit and in response to the aggregation of the indications of load current received from each of the at least one cluster comprising indications of load current lower than a first current threshold, generate a voltage control signal to reduce the no-load voltage. The IC further includes a voltage regulator coupled to the power rail and configured to provide power on the power rail at a supply voltage in a supply voltage range, wherein the supply voltage range comprises a no-load voltage provided in response to no-load current on the power rail.

DETAILED DESCRIPTION

Figure 1:
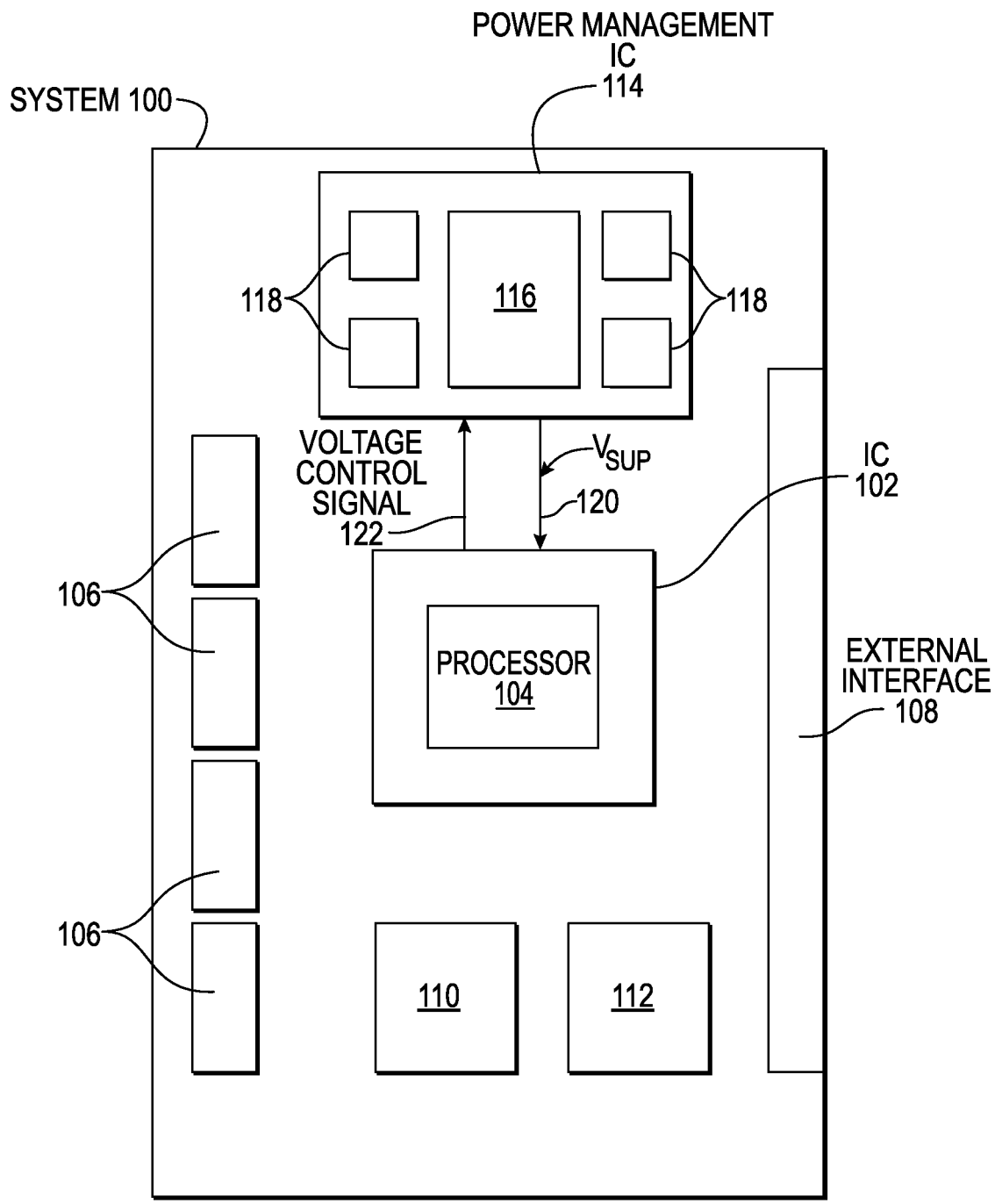
FIG. 1 is a schematic diagram of a plan view of a system card or board including a power source providing power to an exemplary IC, which includes power circuits configured to control the power source to reduce the supply voltage to the IC in a no-load condition to reduce power consumption and improve IC longevity.

Several exemplary aspects of the present disclosure are described in reference to the drawing figures. The word "exemplary" is used herein to mean "serving as an example, instance, or illustration." Any aspect described herein as "exemplary" is not necessarily to be construed as preferred or advantageous over other aspects.

Aspects disclosed in the detailed description include processors including power control circuits to reduce a no-load voltage to save power and increase longevity. Related methods of reducing a no-load voltage are also disclosed. Power sources, such as voltage regulators, provide power to clusters of processor circuits in integrated circuits (ICs). Employing active load line technology or other techniques, power sources maintain a power supply voltage within a desired range in the event of voltage droop, which may be caused by changing activity levels. A maximum supply voltage of the desired range is provided under no-load current conditions. Exemplary power circuits in an IC aggregate indications of load current from processor circuits in the clusters and generate a voltage control signal to control the power source to reduce the supply voltage to reduce power consumption in the IC during zero or low load current conditions. Reducing the no-load voltage also reduces stress on gate oxides of transistors in the IC to increase oxide longevity. Based on the aggregated load current indications, which may be periodically updated, for example, the no-load supply voltage may be incrementally reduced down to a voltage threshold over the course of multiple periods. In some examples, the power circuits receive throttle signals when the processor circuits are throttled due to a voltage droop, and such signals may cause the power circuits to generate a control signal to increase the no-load voltage.

FIG. 1 is a schematic diagram of a system 100 comprising an exemplary integrated circuit (IC) 102, which may be a System-on-Chip (SoC), including a processor (e.g., central processing unit) 104. The system 100 in FIG. 1 may be a card or a board in one example that may include the exemplary IC 102 and may further include cache memory chips 106 and an external interface 108. The system 100 may also include ICs 110 and 112, which may comprise, for example, a graphics processor and an interface control circuit, respectively. The system 100 is not limited in this regard and may include fewer or additional features.

FIG. 1 is provided to show a power management IC 114, which includes a power source 116 external to the IC 102 and configured to provide power to the processor 104. The power management IC 114 also includes capacitors 118 in this example, and the power source 116 may comprise a voltage regulator. As shown in more detail below, the processor 104 may include a plurality of processor circuits, or core circuits (see FIG. 3), that execute instructions. As instructions are executed, circuit switching activity in the processor 104 varies, as does the dynamic load current needed to drive such activity. As the load current changes within the IC 102, the power source 116 responds by adjusting the amount of power provided on a power distribution network 120. However, such response is not immediate, so a supply voltage $V_{SUP}$ may change in response to the change in the load current. For example, in a worst-case situation, the processor 104 may suddenly transition from an inactive or idle state, in which there is little or no-load current being provided to the processor 104, to a highest level of activity requiring a maximum load current.

Viruses and other malware are examples of a type of software developed to create maximum load current conditions but a maximum load current demand can also occur occasionally during normal operation. The sudden increase in load current, known as a di/dt event, causes the supply voltage $V_{SUP}$ to droop from a higher voltage that is provided in a no-load current state to a lower voltage. To avoid processing errors, the supply voltage $V_{SUP}$ cannot be allowed to droop below a first, minimum voltage threshold $V_T$ (not shown) of the transistors in the processor 104. The voltage threshold $V_T$ in this context may refer to a minimum voltage gate to drain voltage at which a transistor (e.g., a field-effect transistor) is turned on (e.g., allows current flow). In this regard, a guard band is included in the supply voltage $V_{SUP}$, as follows. Test programs can be used to intentionally trigger the worst-case di/dt events in the processor 104, to cause the voltage droop, so the magnitude of the worst voltage droop $V_{DRP}$ (not shown) can be measured. Then, based on the first, minimum voltage threshold $V_T$ and the worst voltage droop $V_{DRP}$, the supply voltage $V_{SUP}$ that should be provided by the power source 116 in the zero-load current condition ("no-load voltage") can be determined. That is, a no-load voltage $V_{NL}$ (not shown) is set to be equal to or greater than the minimum voltage threshold $V_T$ plus the worst voltage droop $V_{DRP}$ ($V_{NL} \geq V_T + V_{DRP}$) to avoid processing errors from occurring in response to the worst voltage droop. As described in detail below, the system also includes a voltage control signal 122 generated in the IC 102 to control the supply voltage $V_{SUP}$ from the power source 116.

Figure 2:
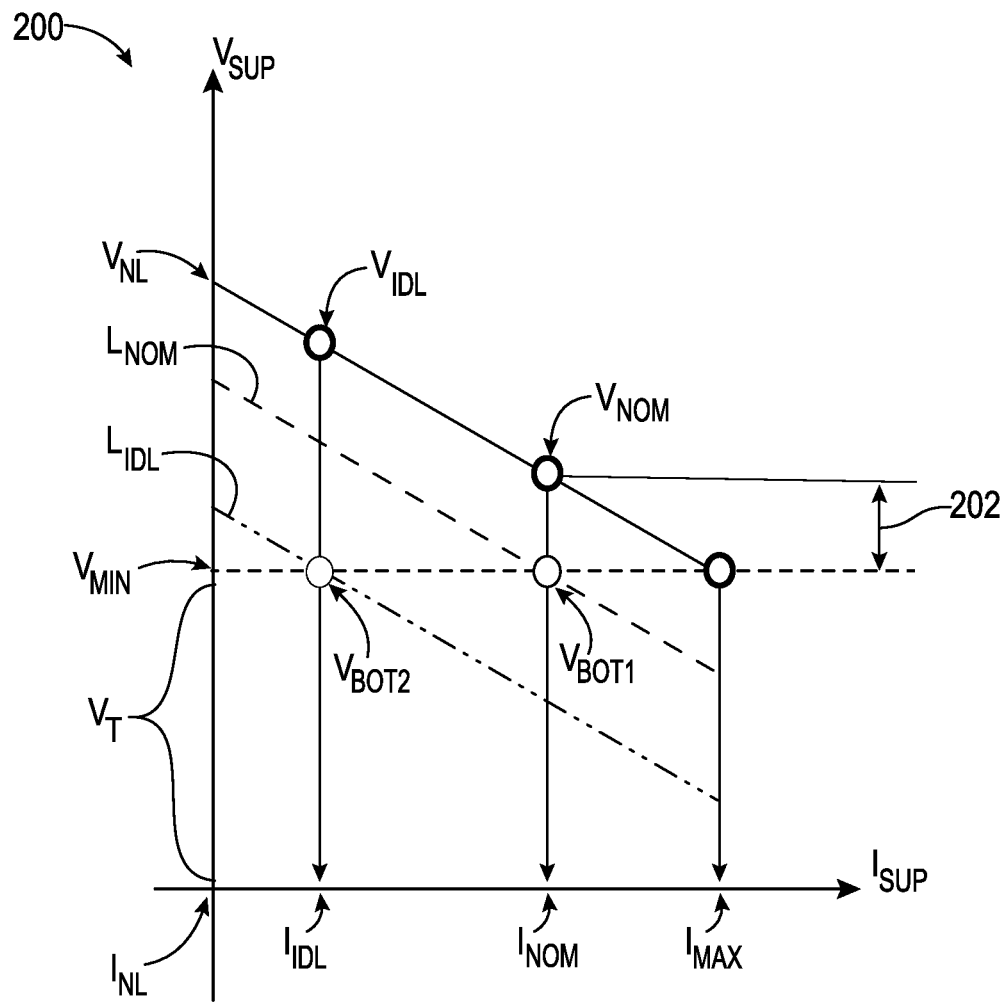
FIG. 2 is a graphical illustration of a supply voltage provided by the power source to the exemplary IC in the system of claim 1 over a range of load currents and showing that power is provided at a higher supply voltage than needed at all levels of load current.

FIG. 2 is a graph 200 of one example of the supply voltage $V_{SUP}$ provided by the power source 116 in FIG. 1 in a range of load current $I_{SUP}$. This example corresponds to a power source employing active load line technology, but the exemplary features of the IC 102 are not limited to this type of power source. Levels of the load current $I_{SUP}$ illustrated in FIG. 2 range from a no-load current ($I_{NL} = I_{SUP} = 0$) to a maximum load current ($I_{SUP} = IMAX$). In the state of having the no-load current $I_{NL}$ the processor 104 may be clock gated, for example, to prevent any circuit switching activity. It should be understood that even when the load current $I_{SUP} = 0$, there continues to be a temperature-dependent leakage of current through circuits in the processor 104. Thus, the no-load current $I_{NL}$ is an indication of a dynamic load current provided to the processor 104, which is separate from a leakage current $I_{LKG}$. As described above, the no-load voltage $V_{NL}$ may be determined as ($V_{NL} \geq V_T + V_{DRP}$) and is the highest supply voltage $V_{SUP}$ provided by the power source 116.

The maximum load current IMAX is provided under the conditions of highest activity or circuit switching in the processor 104. Because the load current cannot increase any further, the supply voltage $V_{SUP}$ will not droop any lower, except for variations due to environmental and/or circuit conditions. Therefore, since no voltage guard band is needed in this condition and it is beneficial to minimize power consumption, the supply voltage $V_{SUP}$ may be set to a minimum supply voltage $V_{MIN}$, which is approximately the first voltage threshold $V_T$. As the load current decreases from the maximum load current IMAX, the supply voltage $V_{SUP}$ may increase linearly or approximately linearly toward the no-load voltage $V_{NL}$. The slope of such linear increase may represent an impedance of the power distribution network coupling the power source 116 to the processor 104.

FIG. 2 shows a nominal load current $I_{NOM}$ which may be typical for the IC 102. The corresponding nominal supply $V_{NOM}$ provided at the nominal load current $I_{NOM}$ is greater than the minimum supply voltage $V_{MIN}$ by a voltage difference 202 that is provided to protect against voltage droop but also represents wasted power as the processor 104 is receiving power at a higher level than necessary for error free operation. The voltage difference 202 also represents an unneeded stress applied to transistor gate oxides in the processor 104. FIG. 2 also shows an idle load current $I_{IDL}$ provided to the processor 104 in an idle mode during which instructions may not be executed but the processor remains ready. Although the idle current $I_{IDL}$ is much lower than the nominal voltage $V_{NOM}$, the supply voltage $V_{SUP}$ is significantly higher, causing excess power consumption and gate oxide stress in the idle condition. Additional features illustrated in FIG. 2 are described below.

Figure 3:
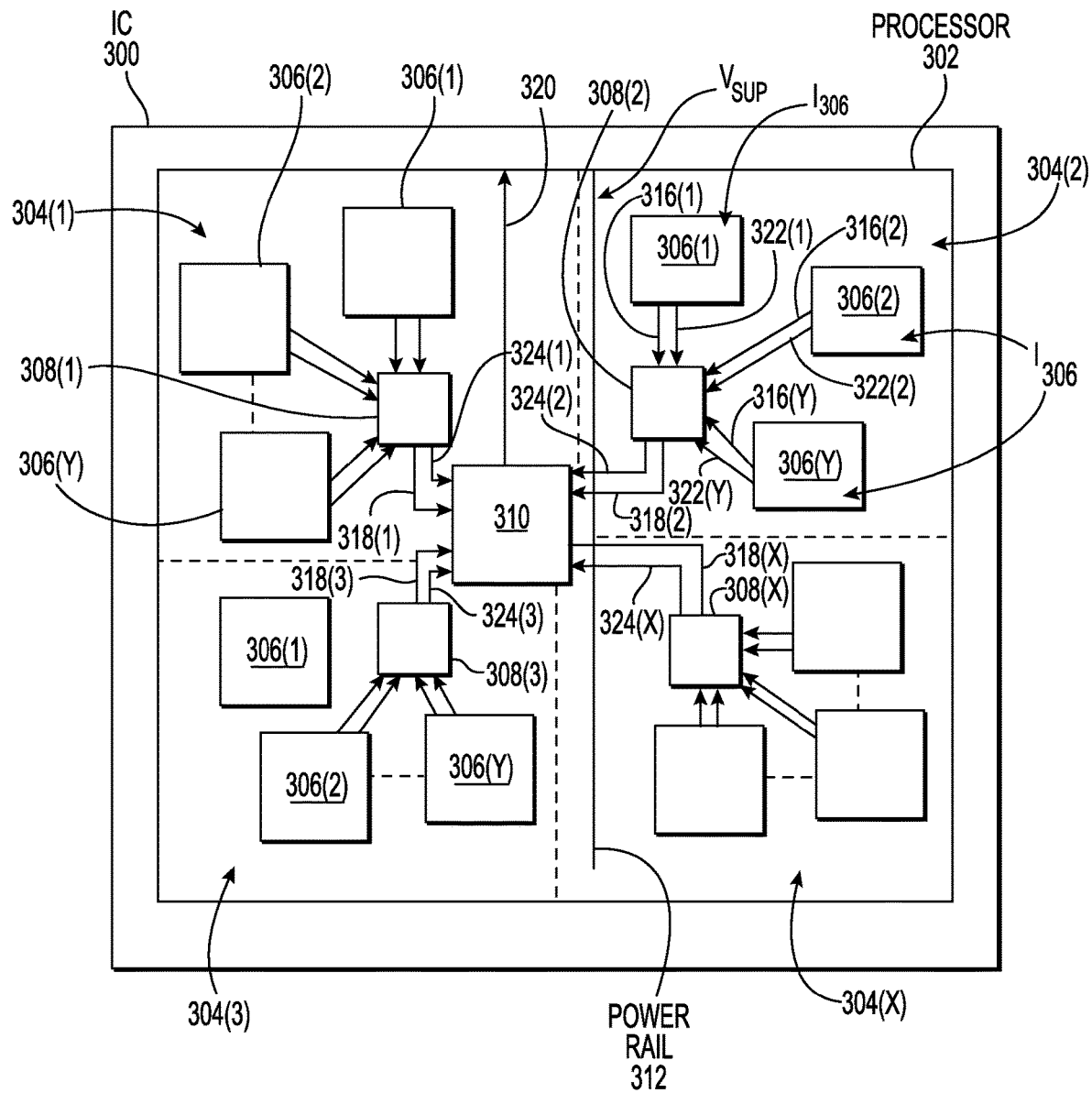
FIG. 3 is a schematic diagram of an exemplary IC comprising clusters of processor circuits and employing power circuits to control a power source to reduce a supply voltage provided in a no-load current condition to reduce power consumption.

FIG. 3 is a schematic diagram of an IC 300 including a processor 302 with clusters 304(1)-304(X) of processor circuits 306(1)-306(Y). The IC 300 may be the IC 102 in FIG. 1. The processor circuits 306(1)-306(Y) may also be referred to as processor cores or core circuits. The IC 300 also includes cluster power circuits 308(1)-308(X) and a processor power circuit 310 to control a power source (e.g., the power source 116 in FIG. 1) to reduce a supply voltage $V_{SUP}$ provided in a zero-load current ("no-load current") condition to reduce power consumption and reduce stress on gate oxides.

One of the cluster power circuits 308(1)-308(X) is employed in each of the clusters 304(1)-304(X) and each of the processor circuits 306(1)-306(Y) is coupled to the corresponding one of the cluster power circuits 308(1)-308(X). For example, in cluster 304(1), the cluster power circuit 308(1) is coupled to each of the processor circuits 306(1)-306(Y). Each of the cluster power circuits 308(1)-308(X) are coupled to the processor power circuit 310. Although this example includes a number X of the clusters 304(1)-304(X), which each include an equal number (Y) in each of processor circuits 306(1)-306(Y), the processor 302 is not limited in this regard. The processor 302 includes at least one cluster 304(1) and each of the clusters 304(1)-304(X) includes at least one processor circuit 306(1). Each of the clusters 304(1)-304(X) may have any number (i.e., one or more) of processor circuits as needed, independent of the other clusters.

The IC 300 also includes a power rail 312, which is part of a power distribution network that transmits power from a power source to the processor circuits 306(1)-306(Y) in each of the clusters 304(1)-304(X).

Supply voltage $V_{SUP}$ is provided at a no-load voltage $V_{NL}$ (not shown in FIG. 3) when the load current $I_{SUP}$ (shown in FIG. 2) on the power rail 312 is zero (e.g., milliamperes) or near-zero. The processor circuits 306(1)-306(Y) include logic circuits (not shown) comprising transistors. As noted above, the load current $I_{SUP}$ refers to a dynamic load current based on circuit activity due to executing instructions and does not include leakage current $I_{LKG}$ leaking through the logic circuits. Power is consumed by the processor 302 even in the idle state due to the leakage current, which is dependent on temperature, supply voltage $V_{SUP}$, and the effective age of the transistors, among other factors. Thus, the high no-load voltage $V_{NL}$ may cause increased power consumption even when there is zero dynamic load current $I_{SUP}$ provided to the processor 302 on the power rail 312. In addition, the high no-load voltage $V_{NL}$ provides a higher than necessary voltage stress on gate oxides of the transistors in the logic circuits, which may prematurely age them, reducing their longevity. Thus, there are multiple reasons to reduce the no-load voltage $V_{NL}$ but the occurrence of voltage droop resulting from a sudden surge in activity (e.g., load current) also needs to be managed.

In this regard, the cluster power circuits 308(1)-308(X) in the clusters 304(1)-304(X) receive indications of load currents $I_{306}$ in each of the processor circuits 306(1)-306(Y). For example, the cluster power circuit 308(2) in the cluster 304(2) receives indications 316(1)-316(Y) from the respective processor circuits 306(1)-306(Y). The indication 316(3), for example, provides an indication (e.g., an estimate or measurement) of the load current $I_{306}$ being received from the power rail 312 to drive activity in the processor circuit 306(3) in the cluster 304(2). The cluster power circuit 308(2) aggregates (e.g., collects, groups, or combines) the indications 316(1)-316(Y) and generates an aggregation 318(2) which is provided to the processor power circuit 310. Each of the other cluster power circuits 308(1) and 308(3)-308(X) also receives, from each of the processor circuits 306(1)-

306(Y), the indications 316(1)-316(Y) and provides aggregations 318(1)-318(X) to the processor power circuit 310.

The processor power circuit 310 receives, from the cluster power circuits 308(1)-308(X) in each of the clusters 304(1)-304(X), the aggregations 318(1)-318(X) of the indications 316(1)-316(Y) of load current $I_{306}$ received from each of the processor circuits 306(1)-306(Y). In response to the aggregations 318(1)-318(X) from each of the clusters 304(1)-304(X) comprising the indications 316(1)-316(Y) of the load current $I_{306}$ indicating load currents $I_{306}$ of less than a first current threshold, the processor power circuit 310 generates a voltage control signal 320. The voltage control signal 320 is provided to the power source (e.g., the power source 116 in FIG. 1) to control the power source to reduce the no-load voltage $V_{NL}$.

For example, if the indications 316(1)-316(Y) from the processor circuits 306(1)-306(Y) in each of the clusters 304(1)-304(X) include only indications that the load currents $I_{306}$ are less than the first current threshold, then the processor power circuit 310 generates the voltage control signal 320 to reduce the no-load supply voltage $V_{NL}$. In such example, if any of the indications 316(1)-316(Y) in any one of the clusters 304(1)-304(X) is above the first current threshold, the processor power circuit 310 may generate the voltage control signal 320 to maintain the no-load voltage $V_{NL}$ (e.g., keep the no-load voltage the same). Further details of generating the indications 316(1)-316(Y), the aggregations 318(1)-318(X), and the voltage control signal 320 are provided below.

Figure 4:
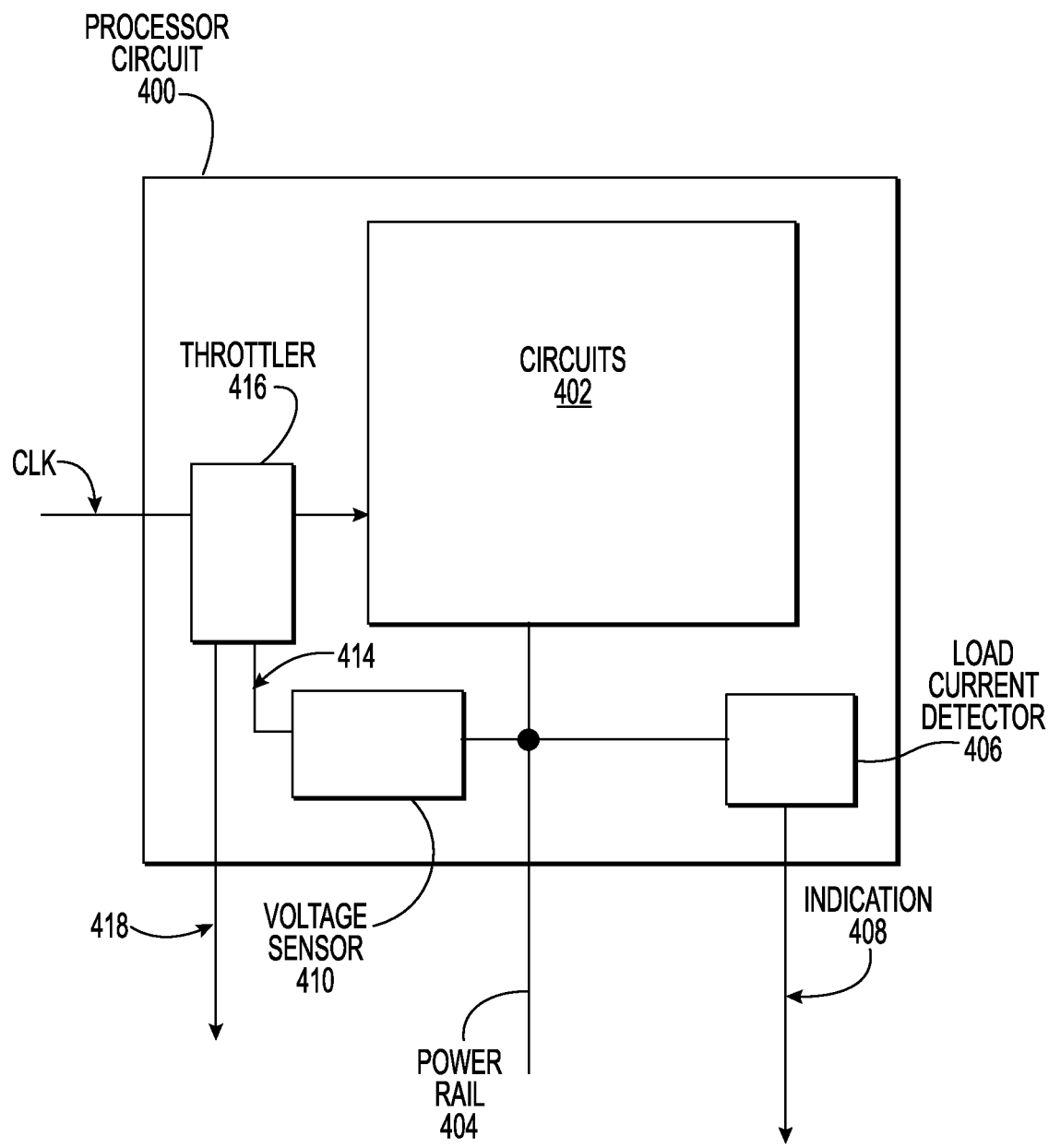
FIG. 4 is a schematic diagram of a processor circuit in the IC in FIG. 3, including a load current detector to provide current indications and a voltage sensor to provide throttle signals to a power circuit in a cluster of at least one processor circuit.

FIG. 4 is a schematic diagram of a processor circuit 400, which may be any of the processor circuits 306(1)-306(Y) in any of the clusters 304(1)-304(X) in FIG. 3. Exemplary aspects of the IC 300 are explained with reference to both FIG. 3 and FIG. 4. The processor circuit 400 includes circuits 402 which may be transistor-based logic circuits to perform the functions of the processor circuit 400, such as executing instructions and/or processing data. The processor circuit 400 includes a power rail 404, which may be coupled to the power rail 312 in the processor 302 in FIG. 3 to receive power at the supply voltage $V_{SUP}$, as described above.

The processor circuit 400 includes a load current detector 406, which may be coupled to the power rail 404 to estimate or measure the load current $I_{306}$ provided to the circuits 402. The load current detector 406 generates an indication 408 of the load current $I_{306}$, which corresponds to the indications 316(1)-316(Y) in each of the clusters 304(1)-304(X) in FIG. 3.

The processor circuit 400 also includes a voltage sensor 410, which may also be coupled to the power rail 404. The voltage sensor 410 senses or detects the supply voltage $V_{SUP}$ provided to the processor circuit 400 on the power rail 404. The voltage sensor 410 may be provided, for example, to generate an indication of a voltage droop, such as when the supply voltage $V_{SUP}$ on the power rail 404 drops below a second voltage threshold. The second voltage threshold may be higher than the voltage threshold $V_T$ in order to generate a droop indication 414 of the voltage droop before the supply voltage $V_{SUP}$ has actually reached the minimum threshold voltage $V_T$. In some examples, the second voltage threshold may be programmable. The droop indication 414 is provided to a throttler 416, which is also included in the processor circuit 400 to throttle activity as needed in response to a voltage droop. The throttler 416 receives the droop indication 414. In response to the droop indication 414, indicating that the supply voltage $V_{SUP}$ has dropped below the second voltage threshold, the throttler 416 reduces power consumption in the processor circuit 400.

In particular, the throttler 416 may reduce a level of activity (e.g., switching activity or instruction execution) in the circuits 402 to reduce the load current $I_{306}$. For example, the throttler 416 may receive a clock signal CLK provided to the circuits 402 and, in response to the droop indication 414, the throttler 416 may increase a period of a clock cycle of the clock CLK. In such example, the throttler 416 may cause the period P to be doubled or otherwise multiplied, for example, to reduce a rate at which activity occurs in the circuits 402 to reduce a rate of power consumption. Reducing the rate of power consumption in the processor circuit 400 may reduce the severity of the voltage droop. In addition to throttling (reducing) activity in the processor circuit 400, the throttler 416 also generates a second throttle signal 418, shown as throttle signals 322(1)-322(Y) in cluster 304(2) in FIG. 3, which is provided to the cluster power circuit 308(3), in this example.

With additional reference back to FIG. 3, in response to receiving the throttle signal 418 from any of the processor circuits 306(1)-306(Y), the cluster power circuit 308(3) generates a cluster throttle signal 324(3), which is provided to the processor power circuit 310. In turn, in response to receiving the cluster throttle signal 324(3), the processor power circuit 310 generates the voltage control signal 320 to control the power source to increase the no-load voltage $V_{NL}$ provided to the power rail 312. It should be understood that the descriptions above regarding operation of a particular one of the clusters 304(1)-304(X) and/or a particular one of the processing circuits 306(1)-306(Y) is also provided as an example of operations of the other ones of the clusters 304(1)-304(X) and the processing circuits 306(1)-306(Y). In addition, the voltage control signal 320 may be implemented as separate signals including one for reducing the no-load voltage $V_{NL}$ in response to the aggregations 318(1)-318(X) and another for increasing the no-load voltage $V_{NL}$ in response to the cluster throttle signals 324(1)-324(X).

Further detail of the operation of the voltage control signal 320 is described with continued reference to FIGS. 3 and 4 and additional reference to FIGS. 5A and 5B, below.

The load current detector 406 in FIG. 4 is configured to detect the load current $I_{SUP}$ and periodically generate the indication 408. For example, the indication 408 may be generated once for every period of length (time) N. The cluster power circuit (e.g., 308(3)) receives the indications 408 from each of the processor circuits 306(1)-306(Y) over a period of length M, which is longer than N. In examples in which M is a multiple of N, multiple indications 408 are received in the cluster power circuit 308(3) in each period of length M. The aggregation 318(3) is generated by the cluster power circuit 308(3) every period of length M. Accordingly, the processor power circuit 310 receives the aggregations 318(1)-318(X) periodically, every period of length M, and determines whether any of the indications 408 indicate that one of the processor circuits 306(1)-306(Y) in any of the clusters 304(1)-304(X) is greater than the first current threshold. In this manner, the voltage control signal 320 to control the power source may be updated periodically, every period of length M, as illustrated in FIG. 5A. Periods of length M are illustrated in FIG. 5A.

Figure 5:
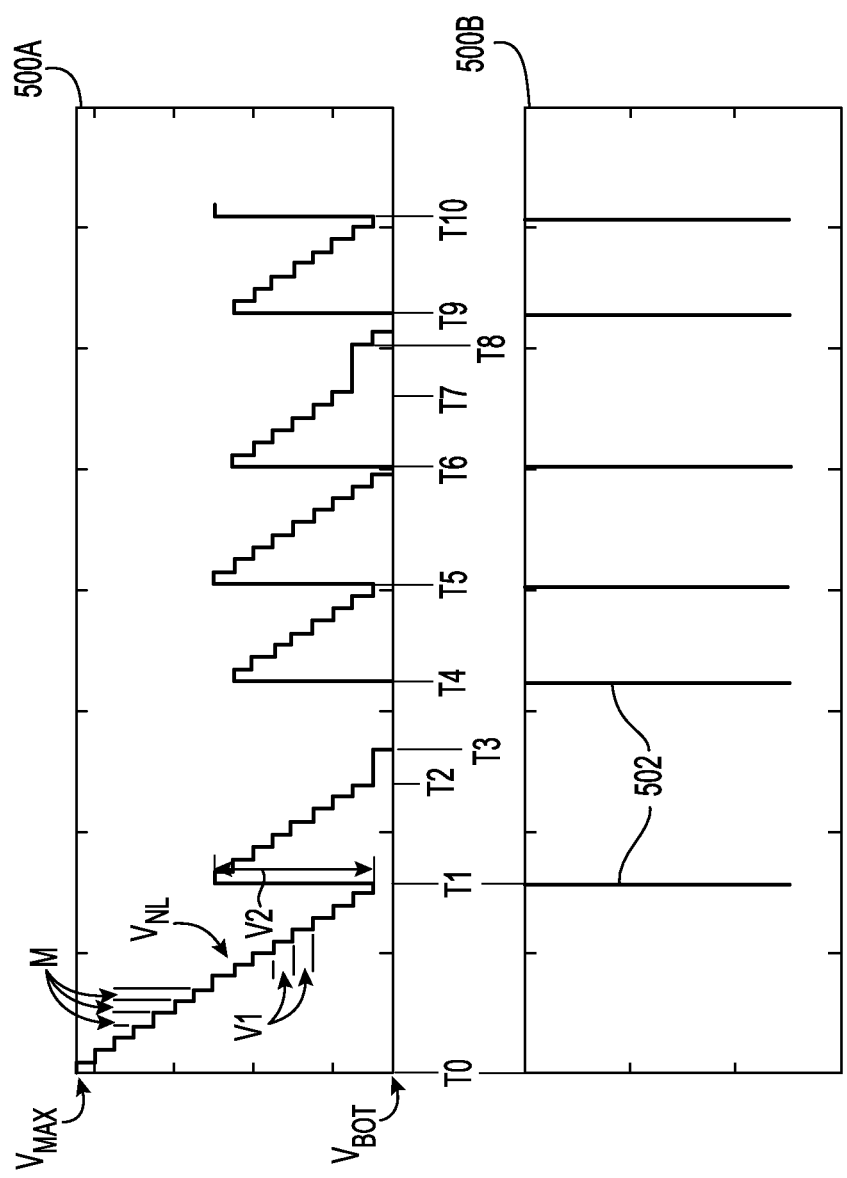
FIG. 5A is a graphical illustration of the no-load voltage in the IC in FIG. 1 in response to throttling signals in FIG. 5B generated over time in the processor circuits in the IC in FIG. 2 and employed by the power circuits to reduce the supply voltage in the IC in the no-load condition.

FIG. 5A is a graphical illustration 500A of the no-load voltage $V_{NL}$ over time in the IC 300 in FIG. 3 in response to the voltage control signal 320, which is based on the aggregations 318(1)-318(X) and the cluster throttling signals 324(1)-324(X). FIG. 5B is a graphical illustration 500B of occurrences of any of the cluster throttling signals 324 (1)-324(X) being generated in the clusters 304(1)-304(X) in the IC 300 in FIG. 3.

In FIG. 5A, the no-load voltage $V_{NL}$ begins at time T0 at an original no-load voltage $V_{MAX}$ that may be provided on the power rail 312 in FIG. 3 by the power source (e.g., the power source 116 in FIG. 1) in the absence of receiving the voltage control signal 320. In each period of length M, the processor power circuit 310 generates the voltage control signal 320 to reduce the no-load voltage $V_{NL}$ by a first voltage increment V1. This reduction of the no-load voltage $V_{NL}$ continues as long as the aggregations 318(1)-318(X) contain indications 316(1)-316(Y) that the load currents $I_{306}$ to each processor 302 are below the first current threshold and none of the cluster throttle signals 324(1)-324(X) are generated.

FIG. 5B shows a signal 502 that is generated in response to any one of the cluster throttle signals 324(1)-324(X), which occurs in each of the times T1, T4, T5, T6, T9, and T10. In response to the signal 502 at time T1, the processor power circuit 310 generates the voltage control signal 320 to control the power source to increase the no-load voltage $V_{NL}$ by a second voltage increment V2. The second voltage increment V2 may be based on a difference between the original no-load voltage $V_{MAX}$ and the no-load voltage $V_{NL}$ at the time T1 of the signal 502. For example, the second voltage increment V2 may be a percentage (e.g., 50%) of a such difference (e.g., V2=($V_{MAX}$-$V_{NL}$)/2). However, the second voltage increment V2 may be a different amount and may be determined in a different manner. For example, the second voltage increment V2 may be based on history and learned responses over time.

After the no-load voltage $V_{NL}$ is increased at time T1, the voltage control signal 320 again reduces the no-load voltage $V_{NL}$ periodically, every period of length M, until time T2, at which the no-load voltage $V_{NL}$ remains the same for two or more periods of length M. This situation, from time T2 to time T3, is indicative of at least one of the aggregations 318(1)-318(X) in at least one of the clusters 304(1)-304(X) indicating a load current $I_{306}$ exceeding the first current threshold, Therefore, the processor power circuit 310 does not generate the voltage control signal 320 to further reduce the no-load voltage $V_{NL}$ until time T3, when no-load voltage $V_{NL}$ is reduced to a voltage threshold $V_{BOT}$. From time T3 to time T4, even if the load currents $I_{306}$ of all the processor circuits 306(1)-306(Y) in all of the clusters 304(1)-304(X) are below the first current threshold, the no-load voltage $V_{NL}$ is not reduced because the minimum voltage threshold $V_{BOT}$ of the no-load voltage $V_{NL}$ has been reached. Stated differently, only if the no-load voltage $V_{NL}$ is above the minimum voltage threshold $V_{BOT}$ will the no-load voltage $V_{NL}$ potentially be reduced in response to the aggregations 318(1)-318(X).

In some examples, the voltage threshold $V_{BOT}$ may depend on a total load current being provided on the power rail 312. As an example, returning to FIG. 2, at the nominal load current $I_{NOM}$, a first voltage threshold $V_{BOT1}$ for the no-load voltage $V_{NL}$ is indicated along the load line $L_{NOM}$ and a second voltage threshold $V_{BOT2}$ for the no-load voltage $V_{NL}$ at idle load current $I_{IDL}$ is indicated along the load line LIDL.

With continuing reference to FIGS. 5A and 5B, at time T4 the no-load voltage $V_{NL}$ is increased by a second voltage increment V2 that is different than at time T1 because the no-load voltage $V_{NL}$ is different at time T4 than at time T1. Operation resumes with periodic reductions of the no-load voltage $V_{NL}$ between respective signals 502 at times T5 and T6. Time T7 to time T8 is another example indicative of at least one of the aggregations 318(1)-318(X) in at least one of the clusters 304(1)-304(X) indicating a load current $I_{306}$ exceeding the first current threshold, so the no-load voltage $V_{NL}$ is not reduced or increased.

The reductions of the no-load voltage $V_{NL}$ below the original no-load voltage $V_{MAX}$ as illustrated in FIG. 5A indicate significant reductions in power consumption and oxide stress in the processor circuits 306(1)-306(Y) based on operation of the cluster power circuits 308(1)-308(X) and the processor power circuit 310 in FIG. 3 over the illustrated period.

Figure 6:
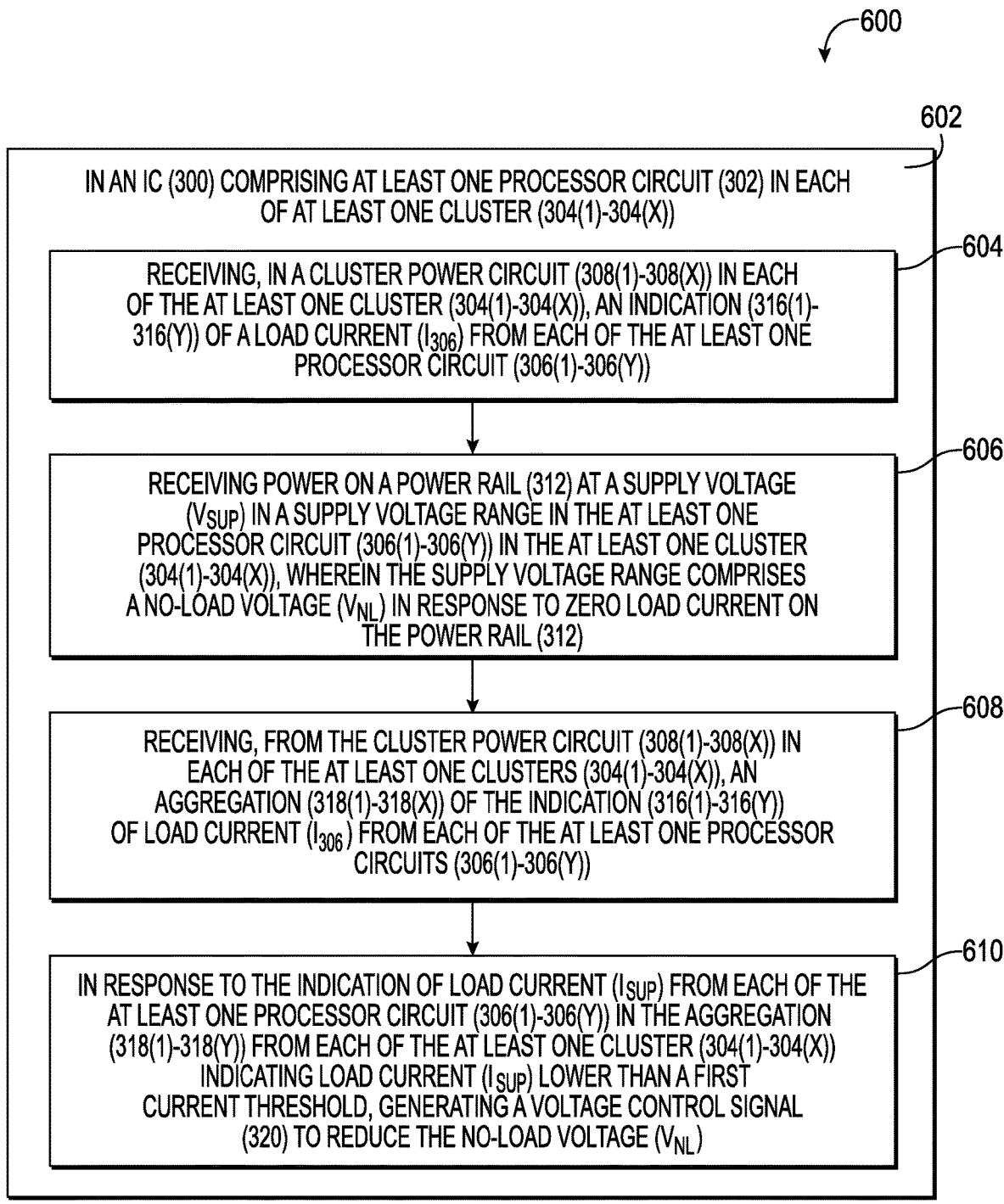
FIG. 6 is a flowchart illustrating an exemplary method of the IC in FIG. 1 of controlling the power source to reduce the supply voltage in the IC in the no-load condition.

FIG. 6 is a flowchart of a method 600 in an IC comprising at least one processor circuit in each of at least one cluster 304(1)-304(X) (block 602). The method 600 comprises receiving, in a cluster power circuit 308(1)-308(X) in each of the at least one cluster 304(1)-304(X), indications 316(1)-316(Y) of a load current $I_{306}$ from each of the at least one processor circuit 306(1)-306(Y) (block 604). The method 600 includes providing power on a power rail 312 at a supply voltage $V_{SUP}$ in a supply voltage range to the at least one processor circuit 306(1)-306(Y) in the at least one cluster 304(1)-304(X), wherein the supply voltage range comprises a no-load voltage $V_{NL}$ in response to zero-load current on the power rail 312 (block 606). The method 600 further includes receiving, from the cluster power circuit 308(1)-308(X) in each of the at least one clusters 304(1)-304(X), an aggregation 318(1)-318(X) of the indications 316(1)-316(Y) of load current $I_{306}$ received from each of the at least one processor circuits 306(1)-306(Y) (block 608). The method 600 includes, in response to the aggregations 318(1)-318(X) from each of the at least one cluster 304(1)-304(X) comprising indications of load currents $I_{SUP}$ lower than a first current threshold, generating a voltage control signal 320 to reduce the no-load voltage $V_{NL}$ (block 610).

Electronic devices according to any aspects disclosed herein, may be provided in or integrated into any processor-based device. Examples, without limitation, include a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, laptop computer, a wearable computing device (e.g., a smartwatch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 7:
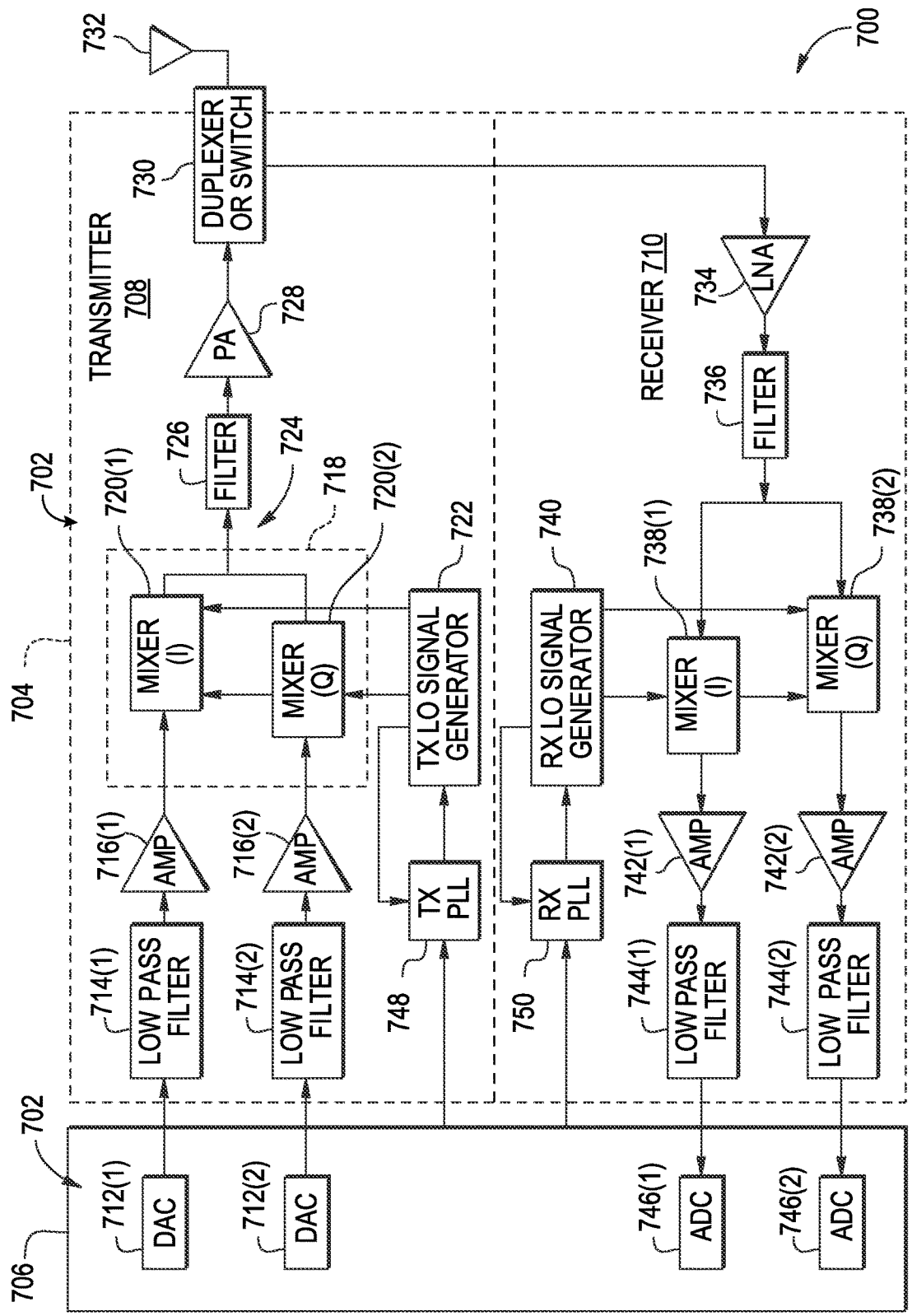
FIG. 7 is a block diagram of an exemplary wireless communication device that includes an IC comprising clusters of processor circuits and employing power circuits to control a power source to reduce a supply voltage provided in a no-load condition to reduce power consumption and reduce stress on gate oxides in the IC as shown in FIGS. 1, 3, and 4 and according to, but not limited to, any of the exemplary methods in FIG. 6.

In this regard, FIG. 7 illustrates a block diagram of an exemplary wireless communications device 700 that includes radio frequency (RF) components formed from one or more ICs 702, wherein any of the ICs 702 can include an integrated circuit (IC) comprising clusters of processor circuits and employing power circuits to control a power source to reduce a supply voltage provided in a zero-load current ("no-load") condition to reduce power consumption as illustrated in FIGS. 1, 3, and 4, and according to the process in FIG. 6. The wireless communications device 700 may include or be provided as examples in any of the above-referenced devices. As shown in FIG. 7, the wireless communications device 700 includes a transceiver 704 and a data processor 706. The data processor 706 may include a memory to store data and program codes. The transceiver 704 includes a transmitter 708 and a receiver 710, which support bi-directional communications. In general, the wireless communications device 700 may include any number of transmitters 708 and/or receivers 710 for any number of communication systems and frequency bands. All or a portion of the transceiver 704 may be implemented on one or more analog ICs, RF ICs (RFICs), mixed-signal ICs, etc.

The transmitter 708 or the receiver 710 may be implemented with a super-heterodyne or direct-conversion architecture. In the super-heterodyne architecture, a signal is frequency-converted between RF and baseband in multiple stages, e.g., from RF to an intermediate frequency (IF) in one stage and then from IF to baseband in another stage. In the direct-conversion architecture, a signal is frequency-converted between RF and baseband in one stage. The super-heterodyne and direct-conversion architectures may use different circuit blocks and/or have different requirements. In the wireless communications device 700 in FIG. 7, the transmitter 708 and the receiver 710 are implemented with the direct-conversion architecture.

In the transmit path, the data processor 706 processes data to be transmitted and provides I and Q analog output signals to the transmitter 708. In the exemplary wireless communications device 700, the data processor 706 includes digital-to-analog converters (DACs) 712(1), 712(2) for converting digital signals generated by the data processor 706 into I and Q analog output signals, e.g., I and Q output currents, for further processing.

Within the transmitter 708, lowpass filters 714(1), 714(2) filter the I and Q analog output signals, respectively, to remove undesired signals caused by the prior digital-to-analog conversion. Amplifiers (AMPs) 716(1), 716(2) amplify the signals from the lowpass filters 714(1), 714(2), respectively, and provide I and Q baseband signals. An upconverter 718 upconverts the I and Q baseband signals with I and Q transmit (TX) local oscillator (LO) signals from a TX LO signal generator 722 through mixers 720(1), 720(2) to provide an upconverted signal 724. A filter 726 filters the upconverted signal 724 to remove undesired signals caused by the frequency upconversion and noise in a receive frequency band. A power amplifier (PA) 728 amplifies the upconverted signal 724 from the filter 726 to obtain the desired output power level and provides a transmit RF signal. The transmit RF signal is routed through a duplexer or switch 730 and transmitted via an antenna 732.

In the receive path, the antenna 732 receives signals transmitted by base stations and provides a received RF signal, which is routed through the duplexer or switch 730 and provided to a low noise amplifier (LNA) 734. The duplexer or switch 730 is designed to operate with a specific receive (RX)-to-TX duplexer frequency separation, such that RX signals are isolated from TX signals. The received RF signal is amplified by the LNA 734 and filtered by a filter 736 to obtain a desired RF input signal. Downconversion mixers 738(1), 738(2) mix the output of the filter 736 with I and Q RX LO signals (i.e., LO_I and LO_Q) from an RX LO signal generator 740 to generate I and Q baseband signals. The I and Q baseband signals are amplified by AMPs 742(1), 742(2) and further filtered by lowpass filters 744(1), 744(2) to obtain I and Q analog input signals, which are provided to the data processor 706. In this example, the data processor 706 includes analog-to-digital converters (ADCs) 746(1), 746(2) for converting the analog input signals into digital signals to be further processed by the data processor 706.

In the wireless communications device 700 of FIG. 7, the TX LO signal generator 722 generates the I and Q TX LO signals used for frequency upconversion, while the RX LO signal generator 740 generates the I and Q RX LO signals used for frequency downconversion. Each LO signal is a periodic signal with a particular fundamental frequency. A TX phase-locked loop (PLL) circuit 748 receives timing information from the data processor 706 and generates a control signal used to adjust the frequency and/or phase of the TX LO signals from the TX LO signal generator 722. Similarly, an RX PLL circuit 750 receives timing information from the data processor 706 and generates a control signal used to adjust the frequency and/or phase of the RX LO signals from the RX LO signal generator 740.

Figure 8:
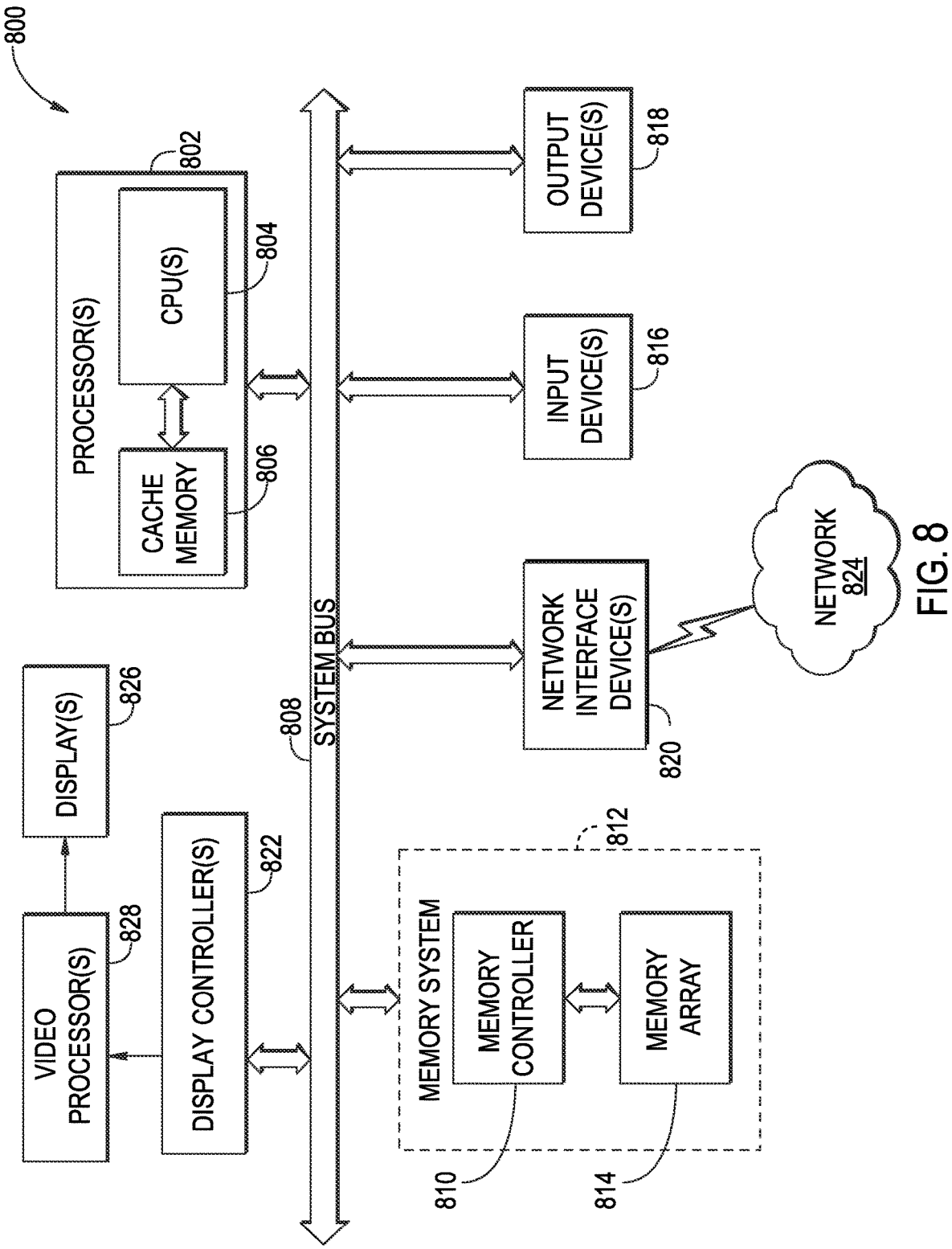
FIG. 8 is a block diagram of an exemplary processor-based system that can include ICs comprising clusters of processor circuits and employing power circuits to control a power source to reduce a supply voltage provided in a no-load condition to reduce power consumption and reduce stress on gate oxides in the IC as shown in FIGS. 1, 3, and 4 and according to, but not limited to, any of the exemplary methods in FIG. 6.

FIG. 8 illustrates a block diagram of an example of a processor-based system 800 that can employ integrated circuits, including an integrated circuit (IC) comprising clusters of processor circuits and employing power circuits to control a power source to reduce a supply voltage provided in a zero-load current ("no-load") condition to reduce power consumption as illustrated in FIGS. 1, 3, and 4, and according to, but not limited to, any of the exemplary processes in FIG. 6. In this example, the processor-based system 800 includes one or more central processor units (CPUs) 804, which may also be referred to as CPU or processor cores, each including one or more processors 802. The CPU(s) 804 may have cache memory 806 coupled to the processor(s) 802 for rapid access to temporarily stored data. The CPU(s) 804 is coupled to a system bus 808 and can intercouple master and slave devices included in the processor-based system 800. As is well known, the CPU(s) 804 communicates with these other devices by exchanging address, control, and data information over the system bus 808. For example, the CPU(s) 804 can communicate bus transaction requests to a memory controller 810 as an example of a slave device. Although not illustrated in FIG. 8, multiple system buses 808 could be provided wherein each system bus 808 constitutes a different fabric.

Other master and slave devices can be connected to the system bus 808. As illustrated in FIG. 8, these devices can include a memory system 812 that includes the memory controller 810 and one or more memory arrays 814, one or more input devices 816, one or more output devices 818, one or more network interface devices 820, and one or more display controllers 822, as examples. The input device(s) 816 can include any type of input device, including, but not limited to, input keys, switches, voice processors, etc. The output device(s) 818 can include any type of output device, including, but not limited to, audio, video, other visual indicators, etc. The network interface device(s) 820 can be any device configured to allow an exchange of data to and from a network 824. The network 824 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 820 can be configured to support any type of communications protocol desired.

The CPU(s) 804 may also be configured to access the display controller(s) 822 over the system bus 808 to control information sent to one or more displays 826. The display controller(s) 822 sends information to the display(s) 826 to be displayed via one or more video processors 828, which process the information to be displayed into a format suitable for the display(s) 826. The display(s) 826 can include any type of display, including, but not limited to, a cathode ray tube (CRT), a liquid crystal display (LCD), a plasma display, or a light-emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium wherein any such instructions are executed by a processor or other processing device, or combinations of both. As examples, the devices and components described herein may be employed in any circuit, hardware component, integrated circuit (IC), or IC chip. Memory disclosed herein may be any type and size of memory and may be configured to store any desired information. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. Alternatively, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using various technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Implementation examples are described in the following numbered clauses:

1. An integrated circuit (IC) comprising:
   at least one cluster, each cluster comprising:
      at least one processor circuit; and
      a cluster power circuit configured to receive, from each of the at least one processor circuit, an indication of a received load current;
   a power rail coupled to a power source configured to provide power at a supply voltage in a supply voltage range to the at least one processor circuit in the at least one cluster, wherein the supply voltage range comprises a no-load voltage provided in response to zero-load current on the power rail; and
   a processor power circuit configured to:
      receive, from the cluster power circuit in each of the at least one cluster, an aggregation of the indication of load current received from each of the at least one processor circuit; and
      in response to the aggregation of the indication of load current from each of the at least one cluster comprising an indication of load current lower than a first current threshold, generate a voltage control signal to reduce the no-load voltage.

2. The IC of clause 1, wherein the processor power circuit is configured to generate the voltage control signal to reduce the no-load voltage in response to the aggregation of the indication of load current from each of the at least one cluster comprising only the indications of load current lower than the first current threshold.

3. The IC of clause 1 or clause 2, wherein each of the at least one processor circuit in each of the at least one cluster comprises:
   a voltage sensor configured to sense the supply voltage on the power rail; and
   a throttler configured to, in response to the voltage sensor sensing the supply voltage below a first voltage threshold:
      reduce a rate of power consumption in the processor circuit; and
      generate a first throttle signal.

4. The IC of clause 3, wherein the cluster power circuit in each of the at least one cluster is further configured to:
   receive the first throttle signal from each of the at least one processor circuit in the cluster; and
   generate a second throttle signal in response to receiving the first throttle signal from any one of the at least one processor circuit in the cluster.

5. The IC of any of clause 1 to clause 4, wherein:
the cluster power circuit is further configured to:
receive the indication of load current from each of the at least one processor circuit periodically, in each period of length N; and
the processor power circuit is further configured to:
receive the aggregation of the indication of load current from the cluster power circuit in each of the at least one cluster periodically, in each period of length M, where M is greater than N; and
generate the voltage control signal to reduce the no-load voltage in each period of length M based on the aggregation of the indication of load current from the cluster power circuit in each of the at least one cluster.

6. The IC of any of clause 1 to clause 5, wherein:
the processor power circuit is further configured to generate the voltage control signal to reduce the no-load voltage by a first voltage increment.

7. The IC of clause 6, wherein:
the processor power circuit is further configured to generate the voltage control signal to reduce the no-load voltage in response to the no-load voltage being above a second voltage threshold.

8. The IC of any of clause 4 to clause 7, wherein:
the processor power circuit is further configured to generate the voltage control signal to increase the no-load voltage provided to the power rail in response to the second throttle signal.

9. The IC of clause 8, wherein:
the processor power circuit is further configured to generate the voltage control signal to increase the no-load voltage by a second voltage increment based on a difference between a first voltage and the no-load voltage.

10. The IC of clause 9, wherein:
the processor power circuit is further configured to generate the voltage control signal increase the no-load voltage based on a percentage of the difference between the first voltage and the no-load voltage.

11. The IC of any of clause 3 to clause 10, wherein the first voltage threshold corresponds to a voltage threshold of a transistor in the at least one processor circuit.

12. The IC of any of clause 1 to clause 11, wherein:
the cluster power circuit in the at least one cluster is configured to provide, to the processor power circuit, an indication of leakage current in the at least one processor circuit; and
the processor power circuit is configured to generate the voltage control signal to the power source to provide power to the power rail based on the indication of leakage current and the aggregation of the indication of load current from the cluster power circuit in the at least one cluster.

13. The IC of any of clause 3 to clause 12, wherein the throttler is further configured to increase a period of a clock cycle of a clock provided to the processor circuit.

14. The IC of any of clause 1 to clause 13, wherein the processor power circuit is configured to generate the voltage control signal to maintain the no-load voltage in response to the aggregation of the indication of load current from the at least one cluster comprising at least one indication of a load current exceeding the first current threshold.

15. The IC of clause 1 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.

16. A method in an integrated circuit (IC) comprising at least one processor circuit in each of at least one cluster, the method comprising:
receiving, in a cluster power circuit in each of the at least one cluster, an indication of load current from each of the at least one processor circuit;
receiving, in the at least one processor circuit in the at least one cluster, power from a power source on a power rail at a supply voltage in a supply voltage range to, wherein the supply voltage range comprises a no-load voltage provided in response to zero-load current on the power rail;
receiving, from the cluster power circuit in each of the at least one cluster, an aggregation of the indication of load current received from each of the at least one processor circuit; and
in response to the aggregation of the indication of load current received from each of the at least one cluster comprising indications of load current lower than a first current threshold, generating a voltage control signal to reduce the no-load voltage.

17. The method of clause 16, further comprising generating the voltage control signal to reduce the no-load voltage in response to the aggregation of the indication of load current from each of the at least one cluster comprising only indications of load current lower than the first current threshold.

18. The method of clause 16 or clause 17, further comprising, in each of the at least one processor circuit in each of the at least one cluster:
sensing the supply voltage on the power rail; and
in response to sensing the supply voltage below a first voltage threshold: reducing a rate of power consumption in the processor circuit; and generating a first throttle signal.

19. The method of any of clause 16 to clause 18, further comprising, in the cluster power circuit in each of the at least one cluster:
receiving the first throttle signal from each of the at least one processor circuit in the at least one cluster; and
generating a second throttle signal in response to receiving the first throttle signal from any one of the at least one processor circuit in the at least one cluster.

20. The method of any of clause 16 to clause 19, further comprising:
receiving, in the cluster power circuit in the at least one cluster, the indication of load current from each of the at least one processor circuit periodically, in each period of length N; and
receiving, in the processor power circuit, the aggregation of the indication of load current from the cluster power circuit in each of the at least one cluster periodically, in each period of length M, where M is greater than N; and
generating the voltage control signal to control the power source to reduce the no-load voltage in each period of length M based on the aggregation of the indication of load current from the cluster power circuit in the at least one cluster.

21. The method of any of clause 16 to clause 20, further comprising generating, in the processor power circuit, the voltage control signal to control the power source to reduce the no-load voltage by a first voltage increment.

22. The method of any of clause 16 to clause 21, further comprising generating, in the processor power circuit, the voltage control signal to control the power source to reduce the no-load voltage in response to the no-load voltage being above a second threshold voltage.

23. The method of any of clause 19 to clause 22, further comprising generating, in the processor power circuit, the voltage control signal to control the power source to increase the no-load voltage provided to the power rail in response to the second throttle signal.

24. The method of clause 23, further comprising generating, in the processor power circuit, the voltage control signal to control the power source to increase the no-load voltage by a second voltage increment that is based on a difference between a first voltage and the no-load voltage.

25. The method of clause 24, further comprising generating, in the processor power circuit, the voltage control signal to control the power source to increase the no-load voltage based on a percentage of the difference between the first voltage and the no-load voltage.

26. The method of any of clause 18 to clause 25, wherein the first voltage threshold corresponds to a threshold voltage of a transistor in the at least one processor circuit.

27. The method of any of clause 16 to clause 26, further comprising:
providing, from the cluster power circuit in the at least one cluster to the processor power circuit, an indication of leakage current in the at least one processor circuit; and
generating, in the processor power circuit, the voltage control signal to the power source, the voltage control signal to control the power source to provide power to the power rail based on the indication of leakage current and the aggregation of the indication of load current from the cluster power circuit in each of the at least one cluster.

28. The method of any of clause 18 to clause 25, wherein reducing a rate of power consumption in the processor circuit further comprises increasing a period of a clock cycle of a clock provided to the processor circuit.

29. The method of any of clause 23 to clause 28, further comprising generating, in the processor power circuit, the voltage control signal to control the power source to maintain the no-load voltage in response to the aggregation of the indication of load current from the cluster power circuit in the at least one cluster comprising at least one indication of load current exceeding the first current threshold.

30. A system comprising:
an integrated circuit (IC) comprising:
at least one cluster, each comprising:
at least one processor circuit; and
a cluster power circuit configured to receive, from each of the at least one processor circuit, an indication of a received load current;
a power rail configured to provide power to the at least one processor circuit in the at least one cluster; and
a processor power circuit configured to:
receive, from the cluster power circuit in each of the at least one cluster, an aggregation of the indication of load current received from each of the at least one processor circuit; and
in response to the aggregation of the indication of load current received from each of the at least one cluster comprising indications of load current lower than a first current threshold, generate a voltage control signal to reduce the no-load voltage; and
a voltage regulator coupled to the power rail and configured to:
provide power on the power rail at a supply voltage in a supply voltage range, wherein the supply voltage range comprises the no-load voltage provided in response to zero-load current on the power rail.

What is claimed is:
1. An integrated circuit (IC) comprising:
at least one cluster, each cluster comprising:
at least one processor circuit; and
a cluster power circuit configured to receive, from each of the at least one processor circuit, an indication of load current;
a power rail configured to provide power at a supply voltage in a supply voltage range to the at least one processor circuit in the at least one cluster, wherein the supply voltage range comprises a no-load voltage in response to zero-load current on the power rail; and
a processor power circuit configured to:
receive, from the cluster power circuit in each of the at least one cluster, an aggregation of the indication of load current received from each of the at least one processor circuit; and
in response to the aggregation of the indication of load current from each of the at least one cluster comprising an indication of load current lower than a first current threshold, generate a voltage control signal to reduce the no-load voltage.

2. The IC of claim 1, wherein the processor power circuit is configured to generate the voltage control signal to reduce the no-load voltage in response to the aggregation of the indication of load current from each of the at least one cluster comprising only indications of load current lower than the first current threshold.

3. The IC of claim 1, wherein each of the at least one processor circuit in each of the at least one cluster comprises:
a voltage sensor configured to sense the supply voltage on the power rail; and
a throttler configured to, in response to the voltage sensor sensing the supply voltage below a first voltage threshold:
reduce a rate of power consumption in the at least one processor circuit; and
generate a first throttle signal.

4. The IC of claim 3, wherein the cluster power circuit in each of the at least one cluster is further configured to:
receive the first throttle signal from each of the at least one processor circuit in the cluster; and
generate a second throttle signal in response to receiving the first throttle signal from any one of the at least one processor circuit in the cluster.

5. The IC of claim 1, wherein:
the cluster power circuit is further configured to:
receive the indication of load current from each of the at least one processor circuit periodically, in each period of length N; and the processor power circuit is further configured to:
receive the aggregation of the indication of load current from the cluster power circuit in each of the at least one cluster periodically, in each period of length M, where M is greater than N; and
generate the voltage control signal to reduce the no-load voltage in each period of length M based on the aggregation of the indication of load current from the cluster power circuit in each of the at least one cluster.

6. The IC of claim 1, wherein:
the processor power circuit is further configured to generate the voltage control signal to reduce the no-load voltage by a first voltage increment.

7. The IC of claim 3, wherein:
the processor power circuit is further configured to generate the voltage control signal to reduce the no-load voltage in response to the no-load voltage being above a second voltage threshold.

8. The IC of claim 4, wherein:
the processor power circuit is further configured to generate the voltage control signal to increase the no-load voltage provided to the power rail in response to the second throttle signal.

9. The IC of claim 8, wherein:
the processor power circuit is further configured to generate the voltage control signal to increase the no-load voltage by a second voltage increment based on a difference between a first voltage and the no-load voltage.

10. The IC of claim 9, wherein:
the processor power circuit is further configured to generate the voltage control signal to increase the no-load voltage based on a percentage of the difference between the first voltage and the no-load voltage.

11. The IC of claim 3, wherein the first voltage threshold corresponds to a voltage threshold of a transistor in the at least one processor circuit.

12. The IC of claim 1, wherein:
the cluster power circuit in the at least one cluster is configured to provide, to the processor power circuit, an indication of leakage current in the at least one processor circuit; and
the processor power circuit is configured to generate the voltage control signal to the power source to provide power to the power rail based on the indication of leakage current and the aggregation of the indication of load current from the cluster power circuit in the at least one cluster.

13. The IC of claim 3, wherein the throttler is further configured to increase a period of a clock cycle of a clock provided to the at least one processor circuit.

14. The IC of claim 1, wherein the processor power circuit is configured to generate the voltage control signal to maintain the no-load voltage in response to the aggregation of the indication of load current from the at least one cluster comprising at least one indication of a load current exceeding the first current threshold.

15. The IC of claim 1 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.

16. A method in an integrated circuit (IC) comprising at least one processor circuit in each of at least one cluster, the method comprising:
receiving, in a cluster power circuit in each of the at least one cluster, an indication of load current from each of the at least one processor circuit;
receiving, in the at least one processor circuit in the at least one cluster, power from a power source on a power rail at a supply voltage in a supply voltage range to, wherein the supply voltage range comprises a no-load voltage provided in response to zero-load current on the power rail;
receiving, from the cluster power circuit in each of the at least one cluster, an aggregation of the indication of load current received from each of the at least one processor circuit; and
in response to the aggregation of the indication of load current received from each of the at least one cluster comprising indications of load current lower than a first current threshold, generating a voltage control signal to reduce the no-load voltage.

17. The method of claim 16, further comprising generating the voltage control signal to reduce the no-load voltage in response to the aggregation of the indication of load current from each of the at least one cluster comprising only indications of load current lower than the first current threshold.

18. The method of claim 16, further comprising, in each of the at least one processor circuit in each of the at least one cluster:
sensing the supply voltage on the power rail; and
in response to sensing the supply voltage below a first voltage threshold:
reducing a rate of power consumption in the at least one processor circuit; and
generating a first throttle signal.

19. The method of claim 18, further comprising, in the cluster power circuit in each of the at least one cluster:
receiving the first throttle signal from each of the at least one processor circuit in the at least one cluster; and
generating a second throttle signal in response to receiving the first throttle signal from any one of the at least one processor circuit in the at least one cluster.

20. The method of claim 16, further comprising:
receiving, in the cluster power circuit in the at least one cluster, the indication of load current from each of the at least one processor circuit periodically, in each period of length N; and
receiving, in the processor power circuit, the aggregation of the indication of load current from the cluster power circuit in each of the at least one cluster periodically, in each period of length M, where M is greater than N; and
generating the voltage control signal to reduce the no-load voltage in each period of length M based on the aggregation of the indication of load current from the cluster power circuit in the at least one cluster.

21. The method of claim 16, further comprising generating, in the processor power circuit, the voltage control signal to reduce the no-load voltage by a first voltage increment.

22. The method of claim 18, further comprising generating, in the processor power circuit, the voltage control signal to reduce the no-load voltage in response to the no-load voltage being above a second voltage threshold.

23. The method of claim 19, further comprising generating, in the processor power circuit, the voltage control signal to increase the no-load voltage provided to the power rail in response to the second throttle signal.

24. The method of claim 23, further comprising generating, in the processor power circuit, the voltage control signal to increase the no-load voltage by a second voltage increment that is based on a difference between a first voltage and the no-load voltage.

25. The method of claim 24, further comprising generating, in the processor power circuit, the voltage control signal to increase the no-load voltage based on a percentage of the difference between the first voltage and the no-load voltage.

26. The method of claim 18, wherein the first voltage threshold corresponds to a threshold voltage of a transistor in the at least one processor circuit.

27. The method of claim 16, further comprising:
providing, from the cluster power circuit in the at least one cluster to the processor power circuit, an indication of leakage current in the at least one processor circuit; and
generating, in the processor power circuit, the voltage control signal to the power source, the voltage control signal to control the power source to provide power to the power rail based on the indication of leakage current and the aggregation of the indication of load current from the cluster power circuit in each of the at least one cluster.

28. The method of claim 18, wherein reducing a rate of power consumption in the at least one processor circuit further comprises increasing a period of a clock cycle of a clock provided to the at least one processor circuit.

29. The method of claim 23, further comprising generating, in the processor power circuit, the voltage control signal to maintain the no-load voltage in response to the aggregation of the indication of load current from the cluster power circuit in the at least one cluster comprising at least one indication of load current exceeding the first current threshold.

30. A system comprising:
an integrated circuit (IC) comprising:
at least one cluster, each cluster comprising:
at least one processor circuit; and
a cluster power circuit configured to receive, from each of the at least one processor circuit, an indication of load current;
a power rail configured to provide power at a supply voltage in a supply voltage range to the at least one processor circuit in the at least one cluster, wherein the supply voltage range comprises a no-load voltage in response to zero-load current on the power rail; and
a processor power circuit configured to:
receive, from the cluster power circuit in each of the at least one cluster, an aggregation of the indication of load current from each of the at least one processor circuit; and
in response to the indication of load current from each of the at least one processor circuit in the aggregation from each of the at least one cluster indicating load current lower than a first current threshold, generate a voltage control signal to reduce the no-load voltage; and
a voltage regulator coupled to the power rail and configured to:
provide power on the power rail at a supply voltage in a supply voltage range, wherein the supply voltage range comprises the no-load voltage provided in response to zero-load current on the power rail.

* * * * *